(12) United States Patent
Carothers (10) Patent No.: US 7,848,601 B2
(45) Date of Patent: Dec. 7, 2010

(54) INTEGRATED OPTICAL LATCH

(75) Inventor: Daniel N. Carothers, Oro Valley, AZ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 12/718,584

(22) Filed: Mar. 5, 2010

(65) Prior Publication Data

US 2010/0157402 A1   Jun. 24, 2010

Related U.S. Application Data

(63) Continuation of application No. 12/201,784, filed on Aug. 29, 2008, now Pat. No. 7,715,663.

(51) Int. Cl.
G02F 1/035 (2006.01)
G02F 1/295 (2006.01)
G02B 6/42 (2006.01)

(52) U.S. Cl. .................... 385/32; 385/3; 385/8; 385/40

(58) Field of Classification Search ............ 385/82–85, 385/87, 15, 16, 24, 37, 31, 3, 32, 40; 398/79
See application file for complete search history.

(56) References Cited

U.S. PATENT DOCUMENTS

| 4,420,258 A | 12/1983 | Burns et al. | |
| 4,547,072 A | 10/1985 | Yoshida et al. | |
| 4,748,617 A | 5/1988 | Drewlo | |
| 4,773,759 A * | 9/1988 | Bergh et al. | 356/460 |
| 4,898,468 A * | 2/1990 | Udd | 356/483 |
| 4,921,354 A | 5/1990 | SooHoo | |
| 5,281,805 A | 1/1994 | Sauer | |
| 5,359,612 A * | 10/1994 | Dennis et al. | 372/18 |
| 5,371,591 A | 12/1994 | Martin et al. | |
| 5,430,755 A | 7/1995 | Perlmutter | |
| 5,493,433 A | 2/1996 | Prucnal et al. | |
| 5,625,636 A | 4/1997 | Bryan et al. | |

(Continued)

FOREIGN PATENT DOCUMENTS

EP   0599453 A1 *   6/1994

(Continued)

OTHER PUBLICATIONS

Notice of Allowability received in related U.S. Appl. No. 12/201,791, dated Dec. 18, 2009.

(Continued)

*Primary Examiner*—Charlie Peng
(74) *Attorney, Agent, or Firm*—Finch & Maloney PLLC; Neil F. Maloney (57) ABSTRACT

Techniques are disclosed for optical switching and data control, without the interaction of electronic switching speeds. In one example embodiment, a common cavity optical latch is provided that that can hold an optical state for an extended period of time, and the operation of which is controlled optically. Optical phase control allows optical modal switching to be employed between two common optical cavities, using incident optical signals and the way in which the cavities manipulate the phase within them to lock in one or the other configuration, thereby forming an optical latch. The optical latch is implemented in an integrated fashion, such as in a CMOS environment.

20 Claims, 3 Drawing Sheets

U.S. PATENT DOCUMENTS

| | | | |
|---|---|---|---|
| 5,674,778 A | 10/1997 | Lee et al. | |
| 5,736,461 A | 4/1998 | Berti et al. | |
| 5,828,476 A | 10/1998 | Bonebright et al. | |
| 5,834,800 A | 11/1998 | Jalali-Farahani et al. | |
| 6,097,529 A | 8/2000 | Lee et al. | |
| 6,117,771 A | 9/2000 | Murphy et al. | |
| 6,242,324 B1 | 6/2001 | Kub et al. | |
| 6,306,722 B1 | 10/2001 | Yang et al. | |
| 6,331,445 B1 | 12/2001 | Janz et al. | |
| 6,387,720 B1 | 5/2002 | Misheloff et al. | |
| 6,400,996 B1 | 6/2002 | Hoffberg et al. | |
| 6,477,285 B1 | 11/2002 | Shanley | |
| 6,605,809 B1 | 8/2003 | Engels et al. | |
| 6,665,480 B2 * | 12/2003 | Watanabe | 385/122 |
| 6,677,655 B2 | 1/2004 | Fitzergald | |
| 6,680,495 B2 | 1/2004 | Fitzergald | |
| 6,725,119 B1 | 4/2004 | Wake | |
| 6,738,546 B2 | 5/2004 | Deliwala | |
| 6,759,720 B2 | 7/2004 | Shinkawata | |
| 6,785,447 B2 | 8/2004 | Yoshimura et al. | |
| 6,795,622 B2 | 9/2004 | Forrest et al. | |
| 6,850,252 B1 | 2/2005 | Hoffberg | |
| 6,861,369 B2 | 3/2005 | Park | |
| 6,936,839 B2 | 8/2005 | Taylor | |
| 6,968,110 B2 | 11/2005 | Patel et al. | |
| 7,006,881 B1 | 2/2006 | Hoffberg et al. | |
| 7,010,208 B1 | 3/2006 | Gunn, III et al. | |
| 7,043,106 B2 | 5/2006 | West et al. | |
| 7,072,556 B1 | 7/2006 | Gunn, III et al. | |
| 7,082,247 B1 | 7/2006 | Gunn, III et al. | |
| 7,126,731 B1 | 10/2006 | Dijaili et al. | |
| 7,139,448 B2 | 11/2006 | Jain et al. | |
| 7,169,654 B2 | 1/2007 | Zia et al. | |
| 7,215,845 B1 | 5/2007 | Chan et al. | |
| 7,218,809 B2 | 5/2007 | Zhou et al. | |
| 7,218,826 B1 | 5/2007 | Gunn, III et al. | |
| 7,245,801 B2 | 7/2007 | Boyd et al. | |
| 7,259,031 B1 | 8/2007 | Dickson et al. | |
| 7,272,279 B2 | 9/2007 | Ishikawa et al. | |
| 7,315,679 B2 | 1/2008 | Hochberg et al. | |
| 7,348,230 B2 | 3/2008 | Matsuo et al. | |
| 7,447,395 B2 | 11/2008 | Montgomery et al. | |
| 2002/0003652 A1 * | 1/2002 | Leuthold | 359/332 |
| 2002/0039830 A1 | 4/2002 | Yeh et al. | |
| 2003/0020144 A1 | 1/2003 | Warble et al. | |
| 2003/0026546 A1 | 2/2003 | Deliwala | |
| 2003/0183825 A1 | 10/2003 | Morse | |
| 2004/0146431 A1 | 7/2004 | Scherer et al. | |
| 2004/0190274 A1 | 9/2004 | Saito et al. | |
| 2005/0012983 A1 | 1/2005 | Parolari et al. | |
| 2005/0094938 A1 | 5/2005 | Ghiron et al. | |
| 2005/0101038 A1 | 5/2005 | Verma et al. | |
| 2005/0253200 A1 | 11/2005 | Murthy et al. | |
| 2006/0105509 A1 | 5/2006 | Zia et al. | |
| 2006/0158723 A1 | 7/2006 | Voigt et al. | |
| 2006/0233504 A1 | 10/2006 | Hochberg et al. | |
| 2006/0238866 A1 | 10/2006 | Von Lerber | |
| 2006/0240667 A1 | 10/2006 | Matsuda et al. | |
| 2007/0116398 A1 | 5/2007 | Pan et al. | |
| 2007/0202254 A1 | 8/2007 | Ganguli et al. | |
| 2008/0159751 A1 | 7/2008 | Matsui et al. | |
| 2008/0240180 A1 | 10/2008 | Matsui et al. | |

FOREIGN PATENT DOCUMENTS

EP        0685722 A2 *  12/1995

OTHER PUBLICATIONS

Office Action from related U.S. Appl. No. 12/201,791 dated Apr. 24, 2009.
Kimmet, "Chapter 6. Integrated Circuit Fabrication Details", 1999, 18 pages.
Office Action from related U.S. Appl. No. 12/201,943 dated dated Jun. 2, 2009 (11 pages).
Office Action from related U.S. Appl. No. 12/201,791 dated Sep. 8, 2009 (17 pages).
Final Office Action Response filed Nov. 4, 2009 in related U.S. Appl. No. 12/201,791.
"Polarization Insensitive NOLM employing a Faraday Rotator Mirror", K. Vyrsokinos, et al., 2004, 2 pages.
"Silicon Germanium CMOS Optoelectronic Switching Device: Bringing Light to Latch", Okyay, et al, IEEE Transactions on Electron Devices, vol. 54, No. 12, Dec. 2007, 8 pages.
"All-Optical Switching and Logic with an Integrated Optic Microring Resonator", Alastair D. McAulay, Proceeding of SPIE, The International Society for Optical Engineering, abstract only, 2005, 1 pg.

\* cited by examiner

INTEGRATED OPTICAL LATCH

RELATED APPLICATIONS

This application is a continuation of U.S. application Ser. No. 12/201,784, filed Aug. 29, 2008. In addition, this application is related to U.S. application Ser. No. 12/201,791, filed Aug. 29, 2008, and titled "Salicide Structures for Heat-Influenced Semiconductor Applications", and to U.S. application Ser. No. 12/201,807, filed Aug. 29, 2008, and titled "Two-Step Hardmask Fabrication Methodology for Silicon Waveguides." Each of these applications is herein incorporated by reference in its entirety.

FIELD OF THE DISCLOSURE

The invention relates to optical communications, and more particularly, to an optical latch.

BACKGROUND

Digital electronics such as logic gates are commonly used in implementing circuits of all kinds. In some such applications, however, the speed at which the gates can switch is limited, by both the gates themselves as well as the clocking signals that enable the switching. Although optical circuits can be used to improve speed, there are oftentimes still instances where optical circuitry interfaces with electronic circuitry, giving rise to switching delays. Moreover, conversion circuitry is needed at the optical-electronic interface, so that optical signals can be converted to electronic signals, and vice-versa. This conversion adds complexity and cost, in addition to delays associated with the conversion process itself as well as with switching delays.

There is an increasing need, therefore, for optical switching and data control.

SUMMARY OF THE INVENTION

One embodiment of the present invention provides an optically controlled optical latch device. The device includes first and second integrated waveguide loops for guiding optical signals. The device further includes a first nonlinear phase shifting element for phase shifting optical signals in the first integrated waveguide loop. The device further includes a first tunable input coupler for receiving a portion of an optical output signal of the second integrated waveguide loop and a first optical input signal, and providing resulting optical input signals in clockwise and counter-clockwise directions of the first integrated waveguide loop. The device further includes a first bias coupler for providing an optical set signal in the first integrated waveguide loop, and a second bias coupler for providing an optical reset signal in the second integrated waveguide loop. The device further includes a first output coupler for providing a portion of an optical output signal of the first integrated waveguide loop to the second integrated waveguide loop. The optical latch device can be triggered on by an optical set signal at the first bias coupler, and triggered off by an optical reset signal at the second bias coupler. In one specific example case, each of the first and second integrated waveguide loops is a high index contrast (HIC) silicon waveguide. In another specific example case, the first nonlinear phase shifting element includes n individually tunable resonant elements. In one such case, the first nonlinear phase shifting element includes a salicide heater structure for providing heat to the n individually tunable resonant elements. In another specific example case, the first nonlinear phase shifting element includes one or more tunable couplers configured with salicide heating elements for optically coupling resonant elements to the first integrated waveguide loop. In another specific example case, the first integrated waveguide loop is configured with an inner ring and an outer ring optically coupled to the inner ring, and the first nonlinear phase shifting element is in the inner ring. In another specific example case, the device may further include a second nonlinear phase shifting element for phase shifting optical signals in the second integrated waveguide loop. In one such case, the second nonlinear phase shifting element includes n individually tunable resonant elements. In another such case, the second integrated waveguide loop is configured with an inner ring and an outer ring optically coupled to the inner ring, and the second nonlinear phase shifting element is in the inner ring. In another specific example case, the device may further include a second tunable input coupler for receiving the portion of the optical output signal of the first integrated waveguide loop and a second optical input signal, and providing resulting optical input signals in clockwise and counter-clockwise directions of the second integrated waveguide loop. In another specific example case, the device may further include a second output coupler for providing the portion of the optical output signal of the second integrated waveguide loop to the first tunable input coupler of the first integrated waveguide loop. Numerous variations and alternative configurations will be apparent in light of this disclosure For instance, another embodiment of the optically controlled optical latch device includes first and second integrated waveguide loops for guiding optical signals, a first nonlinear phase shifting element for phase shifting optical signals in the first integrated waveguide loop, and a second nonlinear phase shifting element for phase shifting optical signals in the second integrated waveguide loop. The device further includes a first tunable input coupler for receiving a portion of an optical output signal of the second integrated waveguide loop and a first optical input signal, and providing resulting optical input signals in clockwise and counter-clockwise directions of the first integrated waveguide loop. The device further includes a first bias coupler for providing an optical set signal in the first integrated waveguide loop, and a second bias coupler for providing an optical reset signal in the second integrated waveguide loop. The device further includes a first output coupler for providing a portion of an optical output signal of the first integrated waveguide loop to the second integrated waveguide loop. The device further includes a second tunable input coupler for receiving the portion of the optical output signal of the first integrated waveguide loop and a second optical input signal, and providing resulting optical input signals in clockwise and counter-clockwise directions of the second integrated waveguide loop. The device further includes a second output coupler for providing the portion of the optical output signal of the second integrated waveguide loop to the first tunable input coupler. The optical latch device can be triggered on by an optical set signal at the first bias coupler, and triggered off by an optical reset signal at the second bias coupler. Each of the first and second integrated waveguide loops can be, for example, a high index contrast (HIC) silicon waveguide. Each of the first and second nonlinear phase shifting elements may include, for instance, n individually tunable resonant elements. In one such example case, each of the first and second nonlinear phase shifting elements includes a salicide heater structure for providing heat to the n individually tunable resonant elements. In another particular case, each of the first and second nonlinear phase shifting elements may include one or more tunable couplers configured with salicide heating elements for optically coupling resonant elements to the corresponding first and second integrated waveguide loops. In another particular case, the first integrated waveguide loop may be configured with an inner ring and an outer ring optically coupled to the inner ring, and the first nonlinear phase shifting element is in the inner ring. In another particular case, the second integrated waveguide loop may be configured with an inner ring and an outer ring optically coupled to the inner ring, and the second nonlinear phase shifting element is in the inner ring.

Another embodiment of the present invention provides an optically controlled optical latch device. In this example case, the device includes first and second integrated waveguide loops for guiding optical signals, and a first nonlinear phase shifting element for phase shifting optical signals in the first integrated waveguide loop, wherein the first integrated waveguide loop is configured with an inner ring and an outer ring optically coupled to the inner ring, and the first nonlinear phase shifting element is in the inner ring. The device further includes a second nonlinear phase shifting element for phase shifting optical signals in the second integrated waveguide loop, wherein the second integrated waveguide loop is configured with an inner ring and an outer ring optically coupled to the inner ring, and the second nonlinear phase shifting element is in the inner ring. The device further includes a first tunable input coupler for receiving a portion of an optical output signal of the second integrated waveguide loop and a first optical input signal (e.g., continuous wave or pulse), and providing resulting optical input signals in clockwise and counter-clockwise directions of the first integrated waveguide loop. The device further includes a first bias coupler for providing an optical set signal (e.g., pulse or other defined set signal) in the first integrated waveguide loop, and a second bias coupler for providing an optical reset signal (e.g., pulse or other defined reset signal) in the second integrated waveguide loop. The device further includes a first output coupler for providing a portion of an optical output signal of the first integrated waveguide loop to the second integrated waveguide loop. The device further includes a second tunable input coupler for receiving the portion of the optical output signal of the first integrated waveguide loop and a second optical input signal, and providing resulting optical input signals in clockwise and counter-clockwise directions of the second integrated waveguide loop. The device further includes a second output coupler for providing the portion of the optical output signal of the second integrated waveguide loop to the first tunable input coupler. The optical latch device can be triggered on by an optical set signal at the first bias coupler, and triggered off by an optical reset signal at the second bias coupler. In one such case, each of the first and second nonlinear phase shifting elements includes n individually tunable resonant elements.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Techniques are disclosed for optical switching and data control without the interaction of electronic switching speeds.

In one example embodiment, a common cavity optical latch is provided that takes advantage of the fact that dense integration of low loss waveguides in silicon can be achieved in a way that allows precise control of phase. This control of the optical phase allows optical modal switching to be employed between two common optical cavities, using incident optical signals and the way in which the cavities manipulate the phase within them to lock in one or the other configuration, thereby forming an optical latch.

The optical latch is implemented in an integrated fashion, such as in a CMOS environment on a silicon substrate. Such an optical latch can be used, for example, in almost any application where a data bus is required. Numerous applications will be apparent, such as in optical computers and data transmission systems, or other such systems where it is desirable to eliminate or otherwise reduce the influence of slower electronic circuits and the complexity associated therewith, and in cases where it is desirable to hold an optical state for an extended period of time.

Nonlinear Interferometer Optical Comparator

Figure 1:
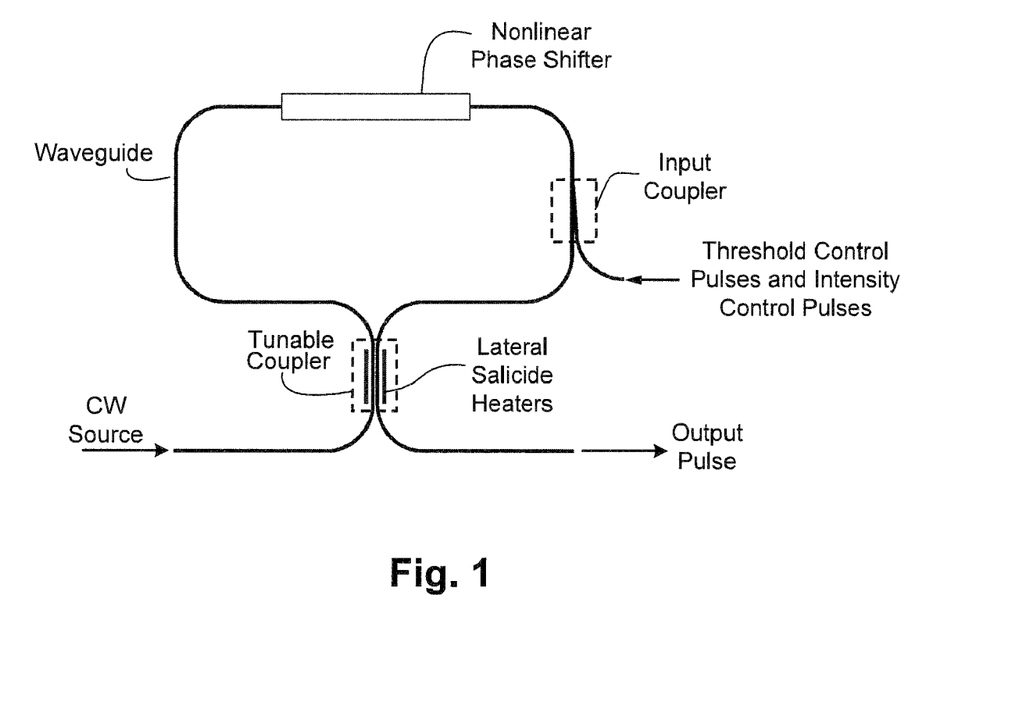
FIG. 1 illustrates a nonlinear interferometer optical comparator configured in accordance with an embodiment of the present invention.

FIG. 1 illustrates a nonlinear interferometer optical comparator configured in accordance with an embodiment of the present invention. As can be seen, the optical comparator includes an integrated waveguide configured with a tunable coupler, a nonlinear phase shifter, and an input coupler.

The tunable coupler has a coupling factor that can be adjusted or 'tuned', by operation of lateral salicide heaters included in the tunable coupler. In operation, when an input signal or pulse is provided (e.g., via CW source), the pulse is received at the tunable coupler and a portion (determined by the coupling factor, k) of the pulse follows a clockwise path around the waveguide, and the remainder follows a counter-clockwise path around the waveguide. The coupling factor can be set in accordance with the thermo-optic effect, by applying heat to the tunable coupler using the lateral salicide heaters, which provide the heat when power or a suitable bias is applied to the heaters. The salicide heaters will be discussed in more detail with reference to FIG. 2, and additional details are provided in the previously incorporated U.S. application Ser. No. 12/201,791. In any case, because of phase shifts across the tunable coupler both into and out of the waveguide loop, these pulses interfere and normally cancel on the output and add at the input.

Thus, the net effect is reflection of the input pulse from the optical comparator. This cancellation is assured in a Sagnac interferometer as the pulses transit identical paths and thus obtain equal phase shifts. By making the tunable coupler unbalanced, such as 70:30 instead of 50:50, the pulses in each direction have unequal intensities. The nonlinear phase shifter element then produces unequal phase shifts due to the unequal intensities. They then do not destructively interfere at the output, and the input pulse effectively switches, or couples, to the output path. This intensity-dependent optical switching (or comparison) is based upon Self Phase Modulation (SPM). Should a different pulse enter the control arm (via the input coupler), the nonlinear phase shift is caused by Cross Phase Modulation (XPM).

Because a threshold control pulse enters the loop in just one direction (by operation of the input coupler), it allows the tunable coupler to be returned to 50:50 coupling, and the waveguide loop will switch between 0 and 100% of the input when the sum of the input pulse plus an intensity control pulse exceeds the loop threshold (differential phase shift of π). This provides a settable/changeable threshold for the optical comparator. The output pulse manifests when the input pulse exceeds the comparator threshold (quantizer level wavelength encoding).

The waveguide, as well as the tunable coupler, input coupler, and nonlinear phase shifter, can be implemented, for example, in silicon, such as a wafer or silicon-on-insulator (SOI) platform. In some embodiments, conventional integrated waveguide fabrication techniques can be used. Alternatively, and in other example embodiments, the waveguide can be fabricated using a two-step hardmask methodology as described in the previously incorporated U.S. application Ser. No. 12/201,807, as will now be described.

In general, the two-step hardmask fabrication process can be used to form a waveguide structures (e.g., channel and/or ridge) along with other circuit features, such as couplers and non-linear phase shifters. The two-step hardmask method enables a stable etch base within semiconductor processing environments, such as the CMOS fabrication environment and other suitable fabrication environments. The process is two-step in that there is deposition of a two-layer hardmask, followed by a first photolithographic pattern, followed by a first silicon etch, then a second photolithographic pattern, and then a second silicon etch. The process can be used, for example, to form a waveguide structure having both ridge and channel configurations, all achieved using the same hardmask. The second photolithographic pattern allows for the formation of the lower electrical contacts to the waveguides without a complicated rework of the hardmask (e.g., the hardmask serves as the waveguide mask through multiple etches, preserving structure of the waveguide). In more detail and in accordance with one embodiment, the two-step process includes deposition of a two-layer hardmask of oxide and nitride over a silicon-on-insulator (SOI) or deposited guide, and then etching the active area and waveguide pattern into the hardmask. As is known, an "active area" is a semiconductor term which defines the areas where electronic components (e.g., gate-level components and tunable couplers, input couplers, phase shifters, etc) will be located. This standard layer is combined into the waveguide layer, and both layers are processed as one in an efficient manner that avoids etching non-uniformities associated with conventional techniques. This first etch is a partial etch and leaves a prescribed amount of silicon left on top of the bottom oxide, so that remaining silicon can be used for a slab region of modulators or other desired components such as salicide heater structures. The hardmask remains on top of the channel waveguide structure, and acts as an etch mask again during the waveguide ridge mask etch. The waveguide ridge mask etch is effectively the second etch in the two-step hardmask waveguide process. In more detail, this second etch is used to define the edges of the ridge waveguide slabs (or other purposeful slab), and completes the partial etch (first etch step) of the thinned silicon down to the bottom oxide, thereby forming a finished channel waveguide. The exposed thinned slab areas are then ready for selective implants for the modulators prior to the oxide deposition of a shallow trench isolation (STI) fill and polish. STI is a standard CMOS process step, and is optional depending on the given application. In addition to its ability to maintain a stable etch base, the two-layer hardmask may serve other purposes. For instance, in some embodiments the hardmask operates to control the penetration depth and configuration of ion implants used to form optical modulators and make contact to optical detectors. It also allows for efficient formation of complex structures including waveguides and other structures (such as lateral heaters in thermo-optic circuits, as described in the previously incorporated U.S. application Ser. No. 12/201,791. The hardmask also allows integration within a chemical mechanical polishing (CMP) based process. In more detail, and in accordance with one particular embodiment, a top silicon nitride layer acts as the hardmask and as a polish stop layer for CMP, thereby preserving waveguide qualities not only across the wafer, but from wafer to wafer. After CMP, the nitride layer can be removed, for example, using a phosphoric acid based etch that is selective to bottom hardmask layer of oxide. Removing the nitride allows for recovery of the original perfect waveguide, and continuation with CMOS based fabrication processes. The two-layer hardmask two-step etch technology also enables a number of electronic components (e.g., CMOS or other) having improved operation.

Nonlinear Phase Shifter

Figure 2:
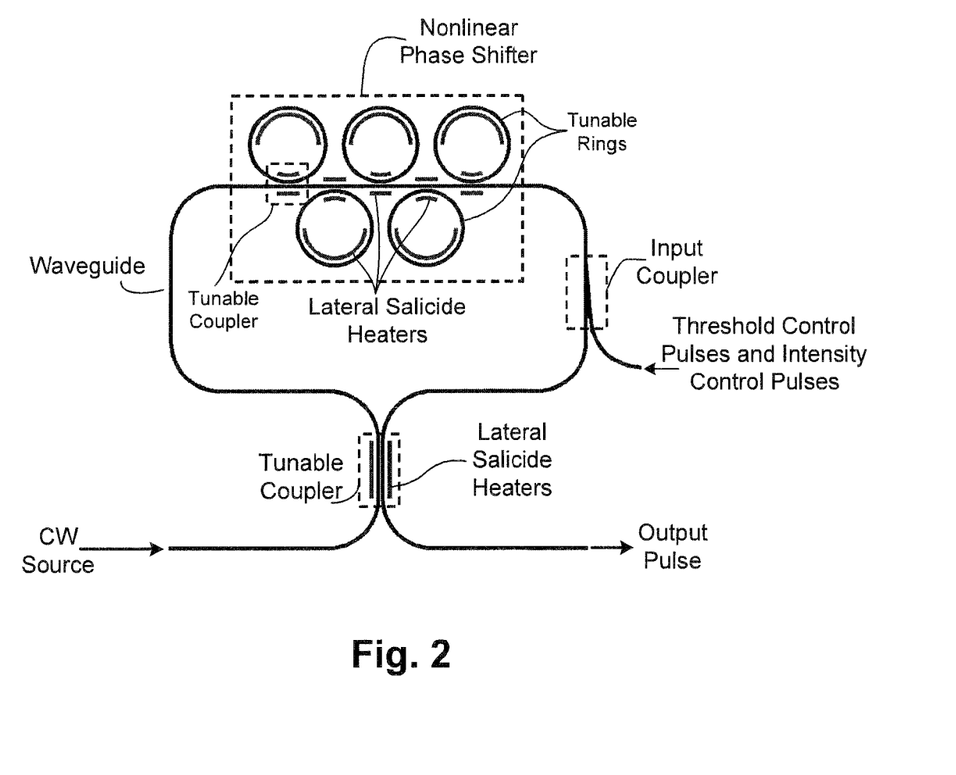
FIG. 2 illustrates a nonlinear phase shifter configured in accordance with an embodiment of the present invention.

FIG. 2 illustrates a nonlinear phase shifter configured in accordance with an embodiment of the present invention. The previous discussion with reference to FIG. 1 is equally applicable here.

As can be seen, the nonlinear phase shifter of this example embodiment is implemented with N individually tunable rings and a number of lateral salicide heater structures and tunable couplers. The heat generated by the heater structures causes the optical signal within the tunable rings to phase shift in accordance with the thermo-optic effect. In addition, the tunable couplers within the nonlinear phase shifter provide tunable coupling between the rings and waveguide. The tunable rings can be implemented, for example, as a tunable array of resonant elements fabricated in silicon along with the waveguide structure. In one example embodiment, the tunable rings are implemented as HIC silicon optical waveguides, and the salicide heater structures are implemented as described in the previously incorporated U.S. application Ser. No. 12/201,791.

In more detail, the salicide heaters allow for greater control over resistivity and uniformity, such that the heaters can operate at CMOS voltage levels (e.g., 0-3.3 volts). In addition, the salicide heaters allow larger temperature fluctuations. Moreover, the salicide heaters do not require shared physical modifications to the waveguide. Nor do the salicide heaters employ any ion implantation. Rather, the heaters are free-standing salicide structures, which can be formed using a combination of CMOS and photonic processing steps. In this sense, the lateral salicide heater structures are distinct from the waveguide structure (i.e., the heaters are not embedded in the cladding or core materials making up the waveguide, or otherwise in physical contact with the waveguide). The free-standing salicide heaters allow the index of refraction variation to be preserved (i.e., uniformity of the refractive index for the cladding all the way around the waveguide). In accordance with one particular embodiment, the salicide heaters are formed using cobalt as the transitional thin film metal, thereby providing cobalt salicide ($CoSi_2$) structures that are the result of a combination of CMOS and photonic processing steps. The salicide heaters allow efficient coupling of thermal energy by allowing closer placement of the heaters to waveguide, thereby keeping the waveguide below the modal field. This also enables lower power operation and higher speed operation, as the salicide heaters do not require as great a thermal load to dissipate into bulk dielectric. The heater thickness can vary as needed, depending on factors such as power and duration and/or frequency of heating cycles, but in one particular embodiment ranges from about 80 Angstroms to 1000 Angstroms. Note, however, that any suitable thicknesses can be used up to the full thickness of the waveguide. The salicide heaters can be shaped or otherwise run proximate the waveguide and/or tunable rings at a distance, for instance, within 0.5 microns, without impeding the effective index variation. The heater structures can be configured with metal contacts that allow power to be applied to each salicide heater, which in turn generates heat for inducing the desired thermo-optic effect (e.g., purposeful adjustment to effective phase delay and coupling coefficient). In the application depicted in FIG. 2, a percentage of radiation (anywhere from 0.001% to 99.99%) traveling in the waveguide is coupled into the rings by the tunable couplers, depending on power applied to the salicide heaters in each tunable coupler and the desired coupling factor. The radiation traveling in the waveguide and rings is phase shifted by the localized heat from the salicide heater structures, and in accordance with the thermo-optic effect. Numerous schemes can be used to apply power to the heater structures to obtain the desired waveguide phase response (e.g., ranging from simple heater power switching schemes to feedback with sensing and monitoring schemes that use real-time adjustments to the applied heater power to get the desired phase response out of the waveguide). The present invention is not intended to be limited to any such scheme. Note that the salicide structure may be shaped differently to suit the given application, as opposed to having the elongated heater elements. For instance, the salicide structure may be shaped as a square or rectangular block or land or other suitable shape that runs proximate the waveguide and/or rings. Alternatively, the heating element may include a number of elongated and/or short runs that meander in various directions proximate a similarly meandering waveguide structure. Heater contact pads can be provided for each heating element, to allow a bias to be applied to activate heating. In short, the salicide structure can be shaped to suit a specific application. In addition, any number of contact configurations can be used, so long as long as power can be delivered to each heater element. Example metals suitable for use in forming the contacts include gold, cobalt, tungsten, nickel, titanium, and platinum. In one particular embodiment, the heater structures are made with cobalt and the contacts (and any vias) are made with tungsten.

Optical Latch

Figure 3:
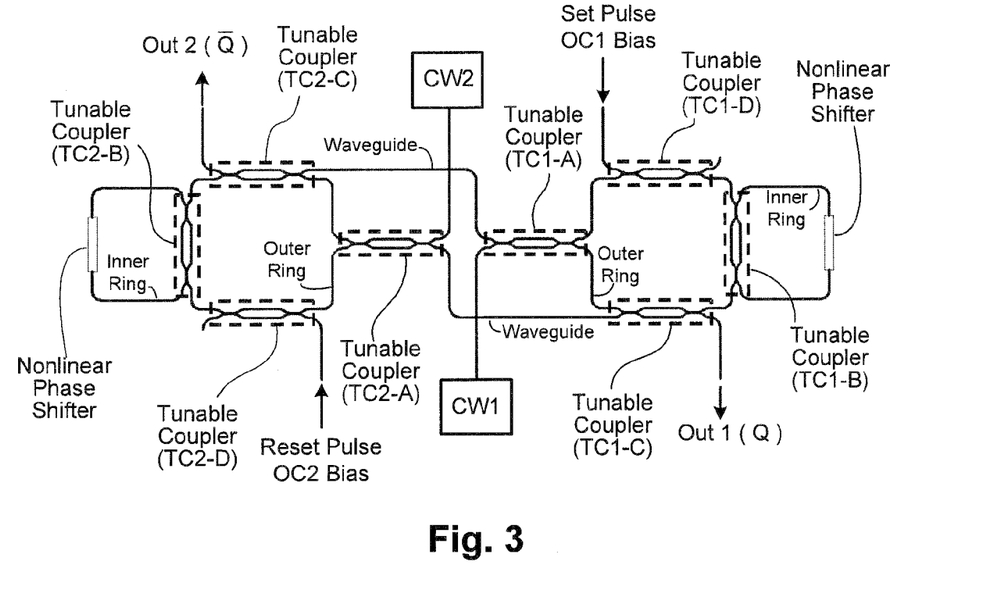
FIG. 3 illustrates an optical latch employing external optical sources CW1 and CW2, in accordance with an embodiment of the present invention.

FIG. 3 illustrates an optical latch employing external optical sources CW1 and CW2, in accordance with an embodiment of the present invention.

As can be seen, the latch in this example embodiment is implemented with two nonlinear interferometer optical comparators as discussed with reference to FIGS. 1 and 2. In addition, the optical comparators forming the latch are resonantly enhanced, in that the optical latch employs a ring-in-a-ring configuration. For each comparator, the inner ring is shown outside the outer ring for purposes of better illustration, but is actually inside the outer ring when deployed. In particular, by placing each of the nonlinear phase shifters within a second resonator structure, the nonlinear phase shift can be enhanced by two to three orders of magnitude, thereby dramatically lowering the switching power, and increasing the A/D dynamic range.

In addition, a tunable coupler (TC2-D) is provided on the left optical comparator (OC2) that allows reset pulse OC2 bias to be applied, and a tunable coupler (TC1-D) is provided on the right optical comparator (OC1) that allows set pulse OC1 bias to be applied. Each of the inner rings of OC1 and OC2 is coupled to its outer ring by a tunable coupler (TC1-B and TC2-B, respectively) as well. Likewise, each of OC1 and OC2 includes a tunable coupler (TC1-C and TC2-C, respectively) that provides a corresponding output: Out 1 (Q) for OC1 and Out 2 (not-Q) for OC2.

This optical latch is triggered on by a set pulse at the set pulse OC1 bias input. Subsequently, it can be triggered off by a reset pulse at the reset pulse OC2 bias input. Such a set/reset scheme allows the output from an optical bus to be brought into a cell (optical latch) without slowing it down with electronic switching. By adding a second latch, the gating of information to the bus can be controlled at a much greater rate of operation than could be achieved with an electronic component alone. A similar configuration allows for storing and rapidly gating information to an optical bus. In this example configuration the electronic component writes a state to the latch. Once the bus comes active, the information is rapidly clocked into the optical bus through the second latch. Simpler output architecture can be achieved by running the output of the latch through an optically addressed bus switch. This can be further extended by combining latches to achieve a serial to parallel converter to rapidly burst in data serially at each wavelength. Other such applications will be apparent in light of this disclosure.

The internal ring of each optical comparator represents a very low threshold, multiple-level shifting optical comparator, where the Reset and Set pulses of each comparator provide a multiple input control intensity. The added internal optically resonant loop, in essence multiplies the nonlinearity of the nonlinear optical loop mirror by the finesse of the optical cavity. This effect is beneficial, for example, for very low thresholds in high-bit photonic A/D conversion. The tunable couplers TC1-B and TC2-B can be tuned to provide a percentage (e.g., anywhere from 0.001% to 99.99%) of signal in the outer ring to the inner ring in both clockwise and counter-clockwise directions.

In operation, each optical comparator OC1 and OC2 acts as follows. The input pulse (CW1 or CW2) is split by a tunable coupler (TC1-A or TC2-A), wherein a portion (determined by the couplers coupling factor k) of the input pulse follows a clockwise path around the waveguide loop, and the remainder follows a counter-clockwise path around the waveguide loop. Because of phase shifts across this tunable coupler (TC1-A or TC2-A) both into and out of the loop, these pulses interfere and normally cancel on the output and add at the input. Therefore the net effect is reflection of the input pulse from the optical comparator (light travels out the path it originally came in on). This cancellation is assured in a Sagnac interferometer as the pulses transit identical paths and thus obtain equal phase shifts. By making the tunable coupler (TC1-A or TC2-A) unbalanced (e.g., tuning the coupler to 70:30 instead of 50:50), the pulses in each direction have unequal intensities. The nonlinear phase shifter then produces unequal phase shifts due to the unequal intensities. They then do not destructively interfere at the output, and the input pulse switches, or couples, to the output path. As previously explained, this intensity-dependent optical switching (or comparison) is based upon Self Phase Modulation (SPM). Should a different wavelength pulse or different same wavelength source enter the control arm (Reset and Set pulses enter via TC1-D and TC2-D), the nonlinear phase shift is caused by Cross Phase Modulation (XPM). With the added loop and tunable coupler (TC1-B or TC2-B) the finesse of the cavity containing the phase modifying element can be optimized allowing a reduction in the power needed to achieve the phase shift of ~1/cavity finesse.

In one embodiment, the control pulse (Reset and Set pulses enter via TC1-D and TC2-D) enters the loop in just one direction, it allows the coupler to be returned to 50:50 coupling, and the loop will switch between 0 and 100% of the input (CW1 or CW2) when the sum of that input plus the control intensity (Reset or Set pulse) exceeds the loop threshold (differential phase shift of pi radians). This provides a settable/changeable threshold for the optical comparator. Note, however, that the optionally tunable couplers TC1-D and TC2-D can be tuned to provide a percentage (e.g., anywhere from 0.001% to 99.99%) of control pulse in the both clockwise and counter-clockwise directions.

In alternative embodiments, an optical latch can be implemented with a single loop body with the nonlinear interferometer optical comparators shown in FIGS. 1 and 2 (i.e., no ring-in-a-ring configuration), where the inner ring is eliminated and the nonlinear phase shifter is moved to the outer ring where the inner ring tunable coupler (TC1-B and TC2-B) is shown. As will be appreciated, that tunable coupler (TC1-B and TC2-B) is not needed for a single ring configuration.

In either the ring-in-ring or single ring configurations, the outputs of each optical comparator (Out 1 for OC1 and Out 2 for OC2) provide complementary signals Q and not-Q, where a percentage (e.g., about 30% to 50%, depending on the coupling factor the output couplers TC1-C and TC2-C) of output signal can be coupled to the other comparator.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An optically controlled optical latch device, comprising:
   first and second integrated waveguide loops for guiding optical signals;
   a first nonlinear phase shifting element for phase shifting optical signals in the first integrated waveguide loop;
   a first tunable input coupler for receiving a portion of an optical output signal of the second integrated waveguide loop and a first optical input signal, and providing resulting optical input signals in clockwise and counter-clockwise directions of the first integrated waveguide loop;
   a first bias coupler for providing an optical set signal in the first integrated waveguide loop;
   a second bias coupler for providing an optical reset signal in the second integrated waveguide loop; and
   a first output coupler for providing a portion of an optical output signal of the first integrated waveguide loop to the second integrated waveguide loop;
   wherein the optical latch device is triggered on by an optical set signal at the first bias coupler, and triggered off by an optical reset signal at the second bias coupler.

2. The device of claim 1 wherein each of the first and second integrated waveguide loops is a high index contrast (HIC) silicon waveguide.

3. The device of claim 1 wherein the first nonlinear phase shifting element includes n individually tunable resonant elements.

4. The device of claim 3 wherein the first nonlinear phase shifting element includes a salicide heater structure for providing heat to the n individually tunable resonant elements.

5. The device of claim 1 wherein the first nonlinear phase shifting element includes one or more tunable couplers configured with salicide heating elements for optically coupling resonant elements to the first integrated waveguide loop.

6. The device of claim 1 wherein the first integrated waveguide loop is configured with an inner ring and an outer ring optically coupled to the inner ring, and the first nonlinear phase shifting element is in the inner ring.

7. The device of claim 1 further comprising:
   a second nonlinear phase shifting element for phase shifting optical signals in the second integrated waveguide loop.

8. The device of claim 7 wherein the second nonlinear phase shifting element includes n individually tunable resonant elements.

9. The device of claim 7 wherein the second integrated waveguide loop is configured with an inner ring and an outer ring optically coupled to the inner ring, and the second nonlinear phase shifting element is in the inner ring.

10. The device of claim 1 further comprising:
    a second tunable input coupler for receiving the portion of the optical output signal of the first integrated waveguide loop and a second optical input signal, and providing resulting optical input signals in clockwise and counter-clockwise directions of the second integrated waveguide loop.

11. The device of claim 1 further comprising:
    a second output coupler for providing the portion of the optical output signal of the second integrated waveguide loop to the first tunable input coupler of the first integrated waveguide loop.

12. An optically controlled optical latch device, comprising:
    first and second integrated waveguide loops for guiding optical signals;
    a first nonlinear phase shifting element for phase shifting optical signals in the first integrated waveguide loop;
    a second nonlinear phase shifting element for phase shifting optical signals in the second integrated waveguide loop;
    a first tunable input coupler for receiving a portion of an optical output signal of the second integrated waveguide loop and a first optical input signal, and providing resulting optical input signals in clockwise and counter-clockwise directions of the first integrated waveguide loop;
    a first bias coupler for providing an optical set signal in the first integrated waveguide loop;
    a second bias coupler for providing an optical reset signal in the second integrated waveguide loop;
    a first output coupler for providing a portion of an optical output signal of the first integrated waveguide loop to the second integrated waveguide loop;
    a second tunable input coupler for receiving the portion of the optical output signal of the first integrated waveguide loop and a second optical input signal, and providing resulting optical input signals in clockwise and counter-clockwise directions of the second integrated waveguide loop;
    a second output coupler for providing the portion of the optical output signal of the second integrated waveguide loop to the first tunable input coupler; and
    wherein the optical latch device is triggered on by an optical set signal at the first bias coupler, and triggered off by an optical reset signal at the second bias coupler.

13. The device of claim 12 wherein each of the first and second integrated waveguide loops is a high index contrast (HIC) silicon waveguide.

14. The device of claim 12 wherein each of the first and second nonlinear phase shifting elements includes n individually tunable resonant elements.

15. The device of claim 14 wherein each of the first and second nonlinear phase shifting elements includes a salicide heater structure for providing heat to the n individually tunable resonant elements.

16. The device of claim 12 wherein each of the first and second nonlinear phase shifting elements includes one or more tunable couplers configured with salicide heating elements for optically coupling resonant elements to the corresponding first and second integrated waveguide loops.

17. The device of claim 12 wherein the first integrated waveguide loop is configured with an inner ring and an outer ring optically coupled to the inner ring, and the first nonlinear phase shifting element is in the inner ring.

18. The device of claim 12 wherein the second integrated waveguide loop is configured with an inner ring and an outer ring optically coupled to the inner ring, and the second nonlinear phase shifting element is in the inner ring.

19. An optically controlled optical latch device, comprising:
  first and second integrated waveguide loops for guiding optical signals;
  a first nonlinear phase shifting element for phase shifting optical signals in the first integrated waveguide loop, wherein the first integrated waveguide loop is configured with an inner ring and an outer ring optically coupled to the inner ring, and the first nonlinear phase shifting element is in the inner ring;
  a second nonlinear phase shifting element for phase shifting optical signals in the second integrated waveguide loop, wherein the second integrated waveguide loop is configured with an inner ring and an outer ring optically coupled to the inner ring, and the second nonlinear phase shifting element is in the inner ring;
  a first tunable input coupler for receiving a portion of an optical output signal of the second integrated waveguide loop and a first optical input signal, and providing resulting optical input signals in clockwise and counter-clockwise directions of the first integrated waveguide loop;
  a first bias coupler for providing an optical set signal in the first integrated waveguide loop;
  a second bias coupler for providing an optical reset signal in the second integrated waveguide loop;
  a first output coupler for providing a portion of an optical output signal of the first integrated waveguide loop to the second integrated waveguide loop;
  a second tunable input coupler for receiving the portion of the optical output signal of the first integrated waveguide loop and a second optical input signal, and providing resulting optical input signals in clockwise and counter-clockwise directions of the second integrated waveguide loop;
  a second output coupler for providing the portion of the optical output signal of the second integrated waveguide loop to the first tunable input coupler; and
  wherein the optical latch device is triggered on by an optical set signal at the first bias coupler, and triggered off by an optical reset signal at the second bias coupler.

20. The device of claim 19 wherein each of the first and second nonlinear phase shifting elements includes n individually tunable resonant elements.

* * * * *